United States Patent
Hino et al.

(10) Patent No.: US 9,111,653 B2
(45) Date of Patent: Aug. 18, 2015

(54) BOILING WATER NUCLEAR PLANT AND METHOD OF REDUCING DOSE IN TURBINE SYSTEM

(75) Inventors: Yuko Hino, Hitachi (JP); Naoshi Usui, Tsukuba (JP); Hidehiro Iizuka, Mito (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 925 days.

(21) Appl. No.: 13/113,609

(22) Filed: May 23, 2011

(65) Prior Publication Data

US 2011/0286568 A1    Nov. 24, 2011

(30) Foreign Application Priority Data

May 24, 2010  (JP) ................. 2010-117915

(51) Int. Cl.
*G21C 19/303*  (2006.01)
*G21F 9/12*  (2006.01)

(52) U.S. Cl.
CPC ............. *G21F 9/12* (2013.01); *G21C 19/303* (2013.01)

(58) Field of Classification Search
CPC ............ G21C 19/303; G21F 9/12; G21F 9/02
USPC .................... 376/313, 314; 423/239.1, 239.2
See application file for complete search history.

(56) References Cited

U.S. PATENT DOCUMENTS

| 4,069,100 | A | * | 1/1978 | Cooper | 376/314 |
|---|---|---|---|---|---|
| 4,495,141 | A | * | 1/1985 | Ozaki | 376/251 |
| 4,992,232 | A | * | 2/1991 | Cowan et al. | 376/306 |
| H920 | H | * | 5/1991 | Carson et al. | 376/314 |
| 5,028,384 | A | * | 7/1991 | Skarpelos et al. | 376/306 |
| 5,470,557 | A | * | 11/1995 | Garney | 376/314 |
| 5,997,829 | A | * | 12/1999 | Sekine et al. | 423/210 |
| 7,027,549 | B2 |  | 4/2006 | Hemmi et al. |  |
| 7,238,332 | B2 | * | 7/2007 | Feaver et al. | 423/210 |
| 2002/0057755 | A1 | * | 5/2002 | Hemmi et al. | 376/313 |

FOREIGN PATENT DOCUMENTS

| JP | 1-102396 A | 4/1989 |
|---|---|---|
| JP | 3-116000 A | 5/1991 |
| JP | 7-151898 A | 6/1995 |
| JP | 2001-147291 | 5/2001 |
| JP | 2001-343480 A | 12/2001 |
| JP | 2005-257626 A | 9/2005 |
| JP | 2009-109318 A | 5/2009 |
| JP | 2009-281893 | 12/2009 |

OTHER PUBLICATIONS

Kozo Tanabe, "Catalyst", 1975, pp. 72-81, vol. 17, No. 3.
Japanese Office Action dated Dec. 24, 2013 including English language translation (Five (5) pages).

* cited by examiner

*Primary Examiner* — Jack W Keith
*Assistant Examiner* — Daniel Wasil
(74) *Attorney, Agent, or Firm* — Crowell & Moring LLP (57) ABSTRACT

An adsorbing substance made of a material having an acid center in its molecular frame is installed in a passage for steam generated in a reactor pressure vessel 1. The adsorbing substance adsorbs and holds N-16 compound for decay. Therefore, the amount of N-16 entering into a turbine system is decreased and dose in the turbine system can be reduced.

10 Claims, 9 Drawing Sheets

FIG. 10

BOILING WATER NUCLEAR PLANT AND METHOD OF REDUCING DOSE IN TURBINE SYSTEM

CLAIM OF PRIORITY

The present application claims priority from Japanese Patent application serial no. 2010-117915, filed on May 24, 2010, the content of which is hereby incorporated by reference into this application.

BACKGROUND OF THE INVENTION

1. Technical Field

The present invention relates to a boiling water nuclear plant and a method of reducing dose in a turbine system, and more particularly, to a boiling water nuclear plant and a method of reducing dose in a turbine system which accepts, as power energy, steam generated in a boiling water reactor.

2. Background Art

In a boiling water nuclear plant, radioactive nitrogen (N-16) is generated from the reaction of oxygen (O-16) in reactor water with neutrons. This N-16 has a half-life of 7.1 seconds, emitting high-energy gamma rays (6.129 MeV). Among the generated N-16, the N-16 in chemical form of high-volatile ammonia ($NH_3$) or nitrogen monoxide (NO) does not remain in the reactor water but is volatilized into steam introduced to a turbine, causing an increase in dose of a turbine system.

Recently, in the boiling water nuclear plants, hydrogen injection is executed in order to prevent stress corrosion cracking in structural material of a reactor pressure vessel and reactor internals by decreasing the amount of dissolved oxygen in the reactor water in the reactor pressure vessel. However, when the amount of injection of the hydrogen is increased, a radiation dose rate in the turbine system tends to rapidly increase after reaching a certain amount of the injection of hydrogen. This is because some N-16 dissolved in the reactor water in a low-volatile chemical form such as nitrate ions during a normal operation are reduced by the hydrogen injection, turn mainly into $NH_3$ which is a high-volatile chemical form, and move with the main steam. Because of the increase in the radiation dose rate, an upper limit is set for the amount of hydrogen to be injected.

As a conventional technology of reducing the amount of N-16 introduced into the turbine system, moving with the main steam, a method has been proposed where the amount of N-16 volatilized into the steam is decreased by adding an agent for reacting with nitrogen compounds to form nonvolatile nitrogen compounds to the reactor water (see Japanese Patent Laid-open No. 2009-109318 for an example).

In addition, a method has been proposed in which N-16 in a high-volatile ammonia form is oxidize into a low-volatile nitrogen oxide by function of a photocatalyst layer containing an ammonia-adsorbing layer provided to a location that Cherenkov light generated in a core reaches (see Japanese Patent Laid-open No. 2009-281893 for an example).

CITATION LIST

Patent Literature

Patent literature 1: Japanese Patent Laid-open No. 2009-109318
Patent literature 2: Japanese Patent Laid-open No. 2009-281893

Non-Patent Literature

Non-patent literature 1: Tanabe, Kozo, Catalyst, 17(3), 72-81 (1975)

SUMMARY OF THE INVENTION

Technical Problem

Unfortunately, as in the technology disclosed in Japanese Patent Laid-open No. 2009-109318, when an agent is added to reactor water, the amount of the agent to be added will be limited to a certain value to meet the water quality standard of the reactor water, so that degree of the effect may also be limited. Furthermore, the addition of the agent may increase a burden on a reactor water clean-up system.

In the technology disclosed in Japanese Patent Laid-open No. 2009-281893, the photocatalyst is placed in a certain location to oxide ammonia, and the location is limited to one that is reached by the Cherenkov light required for the photocatalyst to act, thus the degree of the effect may also be limited.

The present invention has been made in view of the above situations, and it is an object of the present invention to provide a boiling water nuclear plant in which a radiation dose rate in a turbine system of the boiling water nuclear power plant can be reduced by decreasing amount of N-16 entering into the turbine system.

Solution to Problem

A feature of the present invention for attaining the above object is a boiling water nuclear plant in which a solid substance having an acid center in its molecular frame is disposed in a steam passage.

Furthermore, in a the method of reducing dose in a turbine system of a boiling water nuclear plant according to the present invention, it is a feature that N-16 in the form of ammonia contained in the steam is adsorbed on a adsorbing body including a solid substance having an acid center in its molecular frame by disposing the adsorbing body in a steam passage and decayed.

Advantageous Effect of the Invention

According to the present invention, the amount of N-16 in steam can be reduced and the dose in the turbine system can be reduced because a solid substance having an acid center in its molecular frame adsorbs ammonia in the acid center.

DETAILED DESCRIPTION OF THE PREFERRED EMBODIMENTS

Various embodiments of the present invention will be described below with reference to drawings. The present invention is not limited to these embodiments.

[Embodiment 1]

Figure 1:
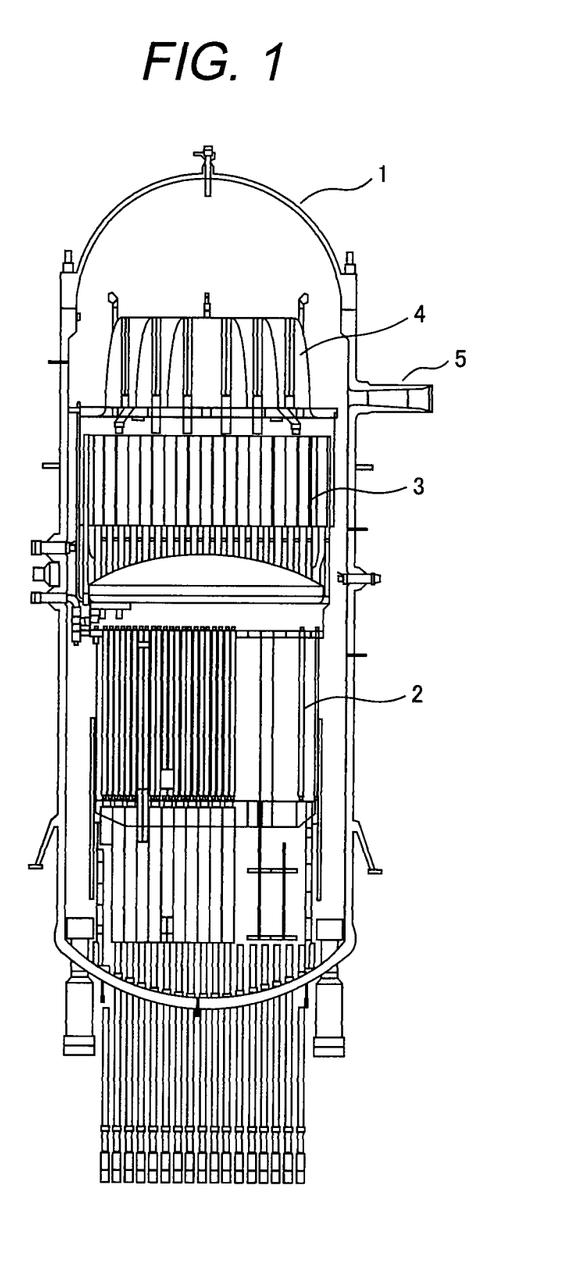
FIG. 1 is a longitudinal sectional view showing a structure of a boiling water nuclear plant according to embodiment 1 which is a preferred embodiment of the present invention.
Figure 2:
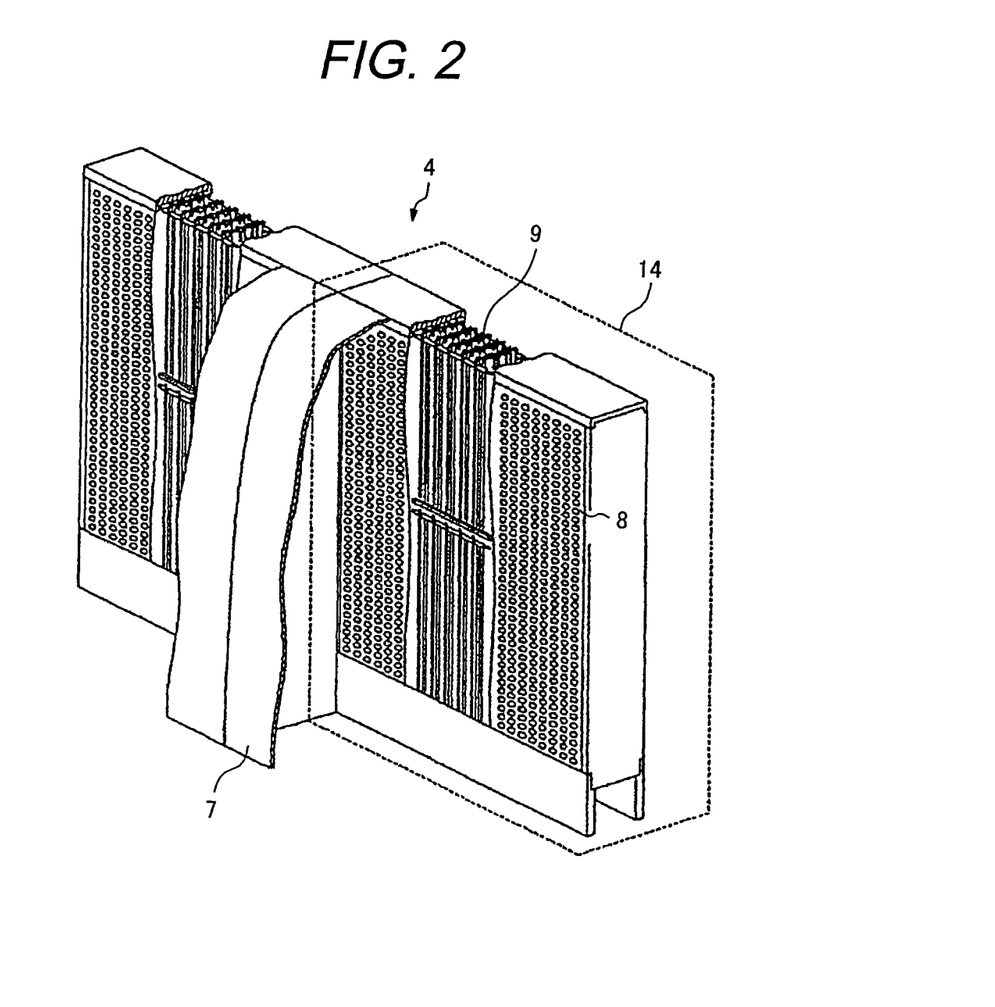
FIG. 2 is a perspective view showing a steam dryer shown in FIG. 1.

A boiling water nuclear plant of the present embodiment will be described with reference to FIG. 1, FIG. 2 and FIG. 3. FIG. 1 is a longitudinal sectional view showing the boiling water nuclear plant according to embodiment 1 of the present invention.

The boiling water nuclear plant shown in FIG. 1 has a reactor pressure vessel 1 in which, a core 2, a steam separator 3, and a stream dryer 4 are installed. In the core 2, cooling water circulating in the reactor pressure vessel 1 and passing through the core 2 is heated by using heat generated by nuclear fission of the nuclear fuel substance included in a plurality of fuel assemblies loaded in the core 2 and a part the heated cooling water turns into steam. The steam generated in the core 2 moves upward in the reactor pressure vessel 1 along with the cooling water until it reaches the steam separator 3 disposed above the core 2. The steam generated in the core 2 is separated from the cooling water in the steam separator 3. The steam which has passed through the steam separator 3 reaches the steam dryer 4, where it is dried by removing droplets from the steam so that the amount of the droplets contained in the steam does not exceed a certain value. The steam containing N-16 nitrogen compounds, dried in the steam dryer 4 is supplied from a main steam nozzle 5 to a steam turbine through a main steam pipe.

Structure of the steam dryer 4 and steam flow within the steam dryer 4 is described with reference to FIG. 2 and FIG. 3. The steam dryer 4 has a plurality of steam dryer units 14 shown in FIG. 2. The steam dryer unit 14 is provided with a hood plate 7, perforated plates 8 and 11, and a plurality of corrugated panels 9. The perforated plate 8 is disposed at an upstream side (inlet side) of the corrugated panels 9, and the perforated plate 11 is disposed at a downstream side (outlet side) of the corrugated panels 9. The perforated plate 8 faces the hood plate 7. The perforated plate 8 has a plurality of through holes 10 being fine pore and the perforated plate 8 also has a plurality of through holes 12 being fine pore. The corrugated panels 9 are disposed between the perforated plate 8 and the perforated plate 11. The hood plate 7 is placed in such a way that the hood plate 7 covers the perforated plate 8 of the steam dryer unit 14, and has an aperture (an inlet) on the lower side. In FIG. 2, only a part of the structure of the hood plate 7 is shown.

Figure 3:
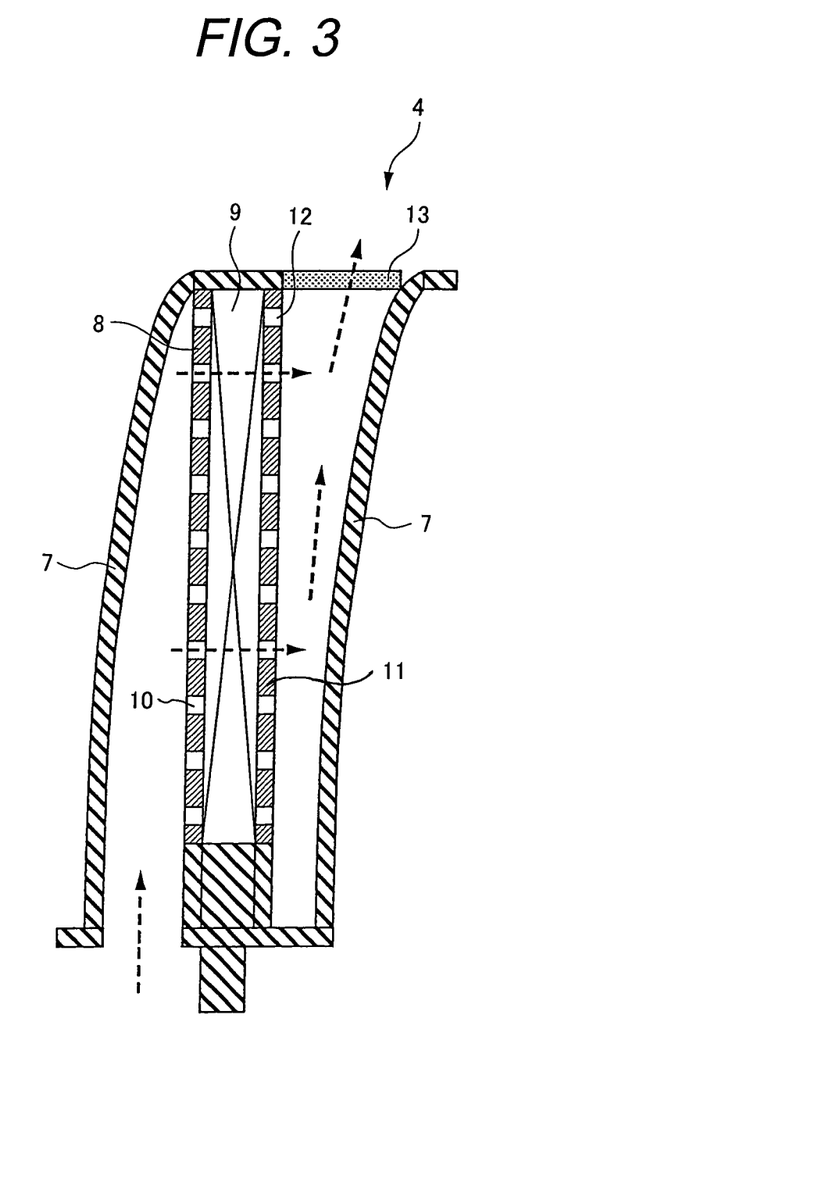
FIG. 3 is a longitudinal sectional view showing a steam dryer shown in FIG. 1.

In FIG. 3, the steam flow is shown by dashed arrows. The steam containing droplets that have passed through the steam separator 3 flows into between the hood plate 7 and the perforated plate 8 from the aperture formed on the lower side of the hood plate 7, and passes through the steam dryer unit 14. To be more specific, the flow direction of the steam is turned from the upward to the horizontal direction in the hood plate 7, and the steam is dispersed by the perforated plate 8 having the plurality of through holes 10, and passes between the corrugated plates 9. The droplets contained in the steam are removed by the corrugated panels 9 while the steam passes between the corrugated plates 9. The steam from which the droplets were removed goes through the plurality of through holes 12 formed in the perforated plate 11, and is discharged into an upper region in the reactor pressure vessel 1 from outlets of the steam dryer 4.

In the steam dryer 4, each of the outlets is formed between the perforated plate 11 of one steam dryer unit 14 and the hood plate 7 of another steam dryer unit 14 that adjoins the one steam dryer unit 14. Adsorption member 13 (see FIG. 3) is disposed in each of the outlets of the steam dryer 4 and attached to the hood plate 7. The steam discharged from the plurality of through holes 12 formed in the perforated plate 11 passes through the adsorption member 13 and is introduced into the upper region in the reactor pressure vessel 1.

Additionally, in the core 2, oxygen atoms (O-16) in the cooling water induce a nuclear reaction with neutrons (n) emitted from the nuclear fuel substance, and generate radioactive nitrogen (N-16) and hydrogen atoms (p), for example, as shown in equation (1).

$$\text{O-16 (n, p) N-16} \qquad (1)$$

The generated N-16 reacts with water molecules in the cooling water and radicals generated by the radiation decomposition of water molecules, and turns into the chemical forms of ammonia and nitrogen oxides (NO, $NO_2$, $NO_3$, etc.) Among the nitrogen compounds containing N-16, those in a high-volatile ammonia form or a NO form move along with the steam in the core 2 as gas. In the conventional boiling water nuclear power plant executing hydrogen injection, ammonia is the main chemical form of N-16. The nitrogen compounds containing N-16, contained in the steam as gas, pass through the steam separator 3 and the steam dryer 4 along with the steam, and are supplied from the main steam nozzle 5 to the steam turbine through the main steam pipe. Because of this, a radiation dose rate in the turbine system is increased by high-energy gamma rays emitted from the N-16.

N-16 has a half-life of 7.1 seconds. This means that the amount of N-16 supplied to the steam turbine can reduce to one half or less by holding the N-16 in the reactor pressure vessel 1 for 7.1 seconds or longer.

In the boiling water nuclear plant according to the present embodiment, the adsorption member 13 is disposed in the reactor pressure vessel 1 as above-mentioned. The adsorption member 13 has a complex oxide, which is a solid substance having an acid center in its molecular frame, made up of two or more kinds of metal oxides so that N-16 is held in the reactor pressure vessel 1 for its half-life period or longer. As the complex oxide, the following may be used: that is, a mixed oxide of at least one of titanium oxide ($TiO_2$), zirconium oxide ($ZrO_2$), zinc oxide (ZnO), aluminum oxide ($Al_2O_3$), and silicon oxide ($SiO_2$) and an oxide of at least one kind of metal other than the above; for example, those shown in Table 1 of Tanabe, Kozo, Catalyst, 17(3), 72-81 (1975), such as $TiO_2$—$ZrO_2$, $TiO_2$—$Fe_2O_3$, ZnO—MgO, $Al_2O_3$—$SiO_2$, $Al_2O_3$—MgO, and $SiO_2$—$Y_2O_3$ may be used.

Figure 4:
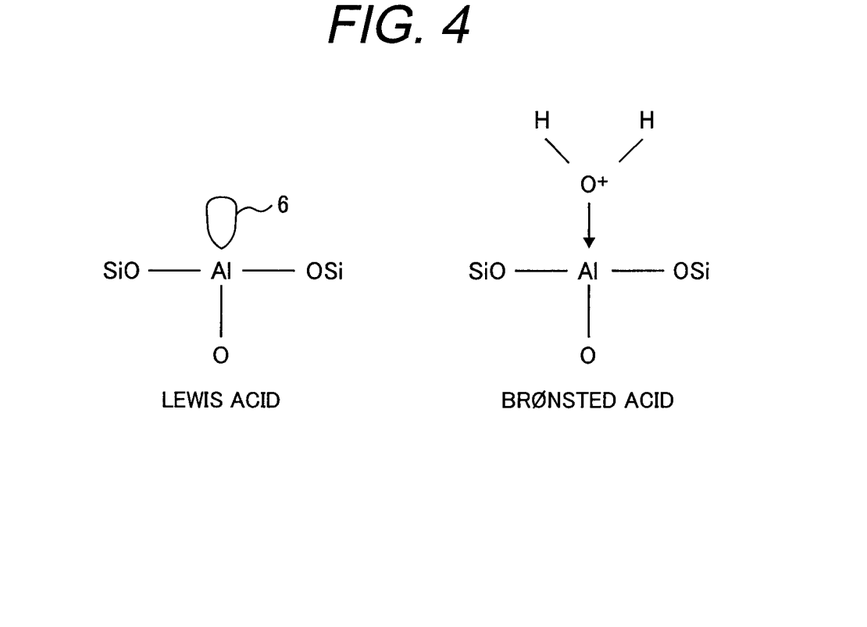
FIG. 4 is an explanatory drawing showing representative models of an acid center structure of $SiO_2$—$Al_2O_3$ as an example of a complex oxide.

These complex oxides have a Lewis acid or a Brønsted acid in their molecular frames. FIG. 4 shows representative models of the acid center structure of $SiO_2$—$Al_2O_3$ as an example of the complex oxide. The Lewis acid is an unoccupied orbital 6 of the aluminum atom, and the Brønsted acid is an $O^+$ portion of a water molecule ($H_2O$) bonded to the aluminum. Ammonia, which is a main form of N-16, is a base; an ammonia molecule can be bonded to the Lewis acid of the complex oxide by supplying the lone pair of the nitrogen atom of the ammonia molecule or to the Brønsted acid through a hydrogen atom of a water molecule. When the bond of the ammonia to the acid center is held for the half-life period of N-16 or longer, a half or more of the N-16 decay into O-16 to become water ($H_2O$), dissociating the bond. This renews the acid center so that ammonia can be newly bonded again.

Figure 5:
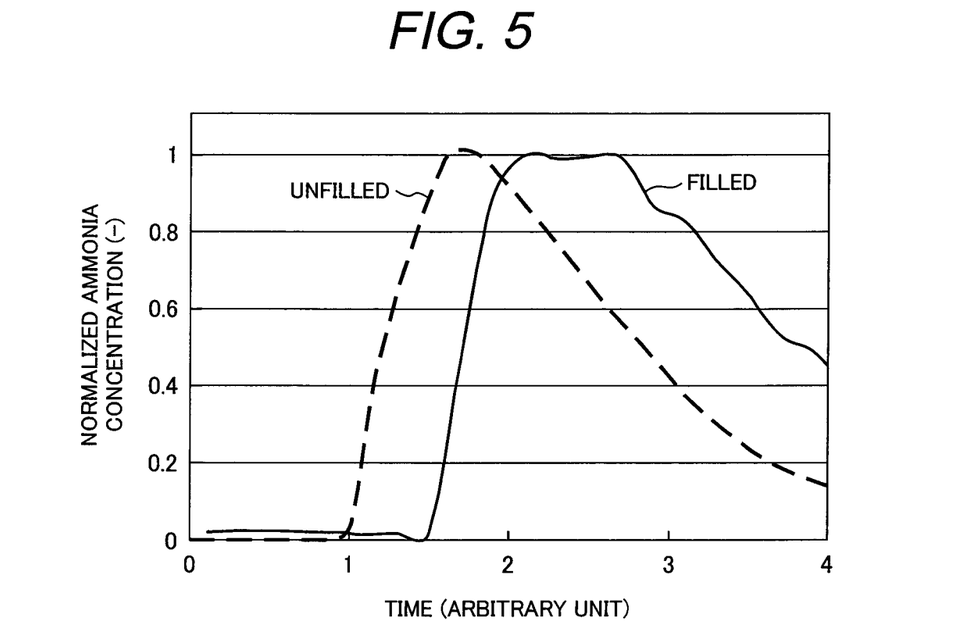
FIG. 5 is an explanatory drawing showing a result of an ammonia adsorption test using $ZrO_2$—$TiO_2$.

FIG. 5 shows a result of a test for checking ammonia adsorption behavior using $ZrO_2$—$TiO_2$ as an example of the complex oxide. In this test, a reactor vessel simulating the inside temperature condition of the reactor pressure vessel 1 was filled with $ZrO_2$—$TiO_2$, steam containing ammonia was supplied in pulses into the reactor vessel, and a concentration of ammonia contained in the steam was measured at an outlet of the reactor vessel. In FIG. 5, a horizontal axis shows the time passed since the beginning of the ammonia supply in pulses, and a vertical axis shows the concentration of ammonia contained in the steam at the outlet of the reactor vessel where measured values are normalized in a way that the highest concentration of ammonia is set to 1. FIG. 5 shows that the peak of a curve for the case when the reactor vessel was filled with the complex oxide occurred later than that for the case without the complex oxide, indicating that ammonia is adsorbed and held to $ZrO_2$—$TiO_2$.

The complex oxide of the adsorption member 13 adsorbs a nitrogen compound containing N-16 contained in the steam discharged from the plurality of through holes 12 formed in the perforated plate 11.

The adsorption member 13 may be disposed in any location in which the complex oxide of the adsorption member 13 is come in contact with steam passing in the reactor pressure vessel 1. Preferably, it is disposed in a location after steam has been dried, that is, anywhere between the steam dryer and an inlet of the main steam pipe.

Even more preferably, it is disposed in the area where linear velocity of steam is small, for example, an area from the steam dryer to the vicinity of the upper portion of the steam dryer.

The adsorption member 13 has a structure body made of metal and the like, and the complex oxide applied and attached to the structure body. The structure body may be a structure body which can minimize a pressure drop by as much as possible to prevent a decrease in power generation efficiency; for example, a honeycomb structure, a narrow tube, a foam structure, or a net-like structure may be chosen. The adsorption member 13 may be composed by filling a casing made of gauze with the complex oxide.

The complex oxide to be installed may be one kind of complex oxide or a mixture of multiple kinds of complex oxides. A noble metal such as platinum and the like may be supported by the complex oxide. This may improve the performance of ammonia adsorption or produce an effect of adsorbing N-16 in the form of nitrogen monoxide as well.

As above, according to the present embodiment, since the adsorption member 13 is installed in the location (for example, the outlets of the steam dryer 4) in which the complex oxide is come in contact with steam in the reactor pressure vessel 1, and ammonia containing N-16 is adsorbed and held by the complex oxide, the N-16 can be decayed into O-16 and the N-16 supplied to the turbine system can be decreased. Therefore, a radiation dose rate in the turbine system can be reduced by the complex oxide of the adsorption member 13.

[Embodiment 2]

An embodiment 2 of the present invention will be described. Since the flow of steam in the reactor pressure vessel 1 is the same as in the embodiment 1, it will not be described.

In a boiling water nuclear plant according to the present embodiment, an adsorption member 13 having a metal oxide which is a solid substance having an acid center in its molecular frame, is installed in the outlet of the steam dryer 4 to hold N-16 for the half-life period of N-16 or longer as with the embodiment 1. As the metal oxide, at least one of titanium oxide ($TiO_2$), zirconium oxide ($ZrO_2$), aluminum oxide ($Al_2O_3$), zinc oxide ($ZnO$), silicon oxide ($SiO_2$), molybdenum oxide ($MoO_3$), and tin oxide ($SnO_2$) may be used. Each of these oxides is acidic by itself and can bond with ammonia, which is a base. In addition, the oxides of alkaline earths, for example, magnesium oxide ($MgO$) and calcium oxide ($CaO$), and the oxides of lanthanoid and actinoid, for example, lanthanum oxide ($La_2O_3$), yttrium oxide ($Y_2O_3$), and thorium oxide ($Th_2O_3$), are mainly a basic solid substance. However, since they have an acid center in their molecular frames, these oxides can also bond with ammonia and hold it.

As the metal oxide used in the present embodiment, one kind of metal oxide or a mixture of multiple oxides may be used.

In the present embodiment, the adsorption member 13 having the metal oxide may be disposed in any location that is exposed to steam passing in the reactor pressure vessel 1; for example, any place between the steam separator and the inlet of the main steam pipe may be chosen.

The adsorption member 13 has a structure body made of metal and the like, and the metal oxide applied and attached to the structure body. $ZrO_2$ or $Al_2O_3$ can be shaped into a form by itself to produce a structure having the strength of metal, thus part of a reactor internal in the reactor pressure vessel 1 may be produced with the metal oxide. The adsorption member 13 may be composed by filling a casing made of gauze with the metal oxide.

As above, according to the present embodiment, since the adsorption member 13 being a structure body made of the metal oxide or the adsorption member 13 having a structure body made of metal and the like, on which the metal oxide is attached, can be installed in a location (for example, the outlet of the steam dryer 4) in which the metal oxide is come in contact with steam in the reactor pressure vessel 1 to adsorb and hold N-16, the N-16 supplied to the turbine system can be decreased and a radiation dose rate in the turbine system can be reduced.

[Embodiment 3]

An embodiment 3 of the present invention will be described. Since the flow of steam in the reactor pressure vessel 1 is the same as in the embodiment 1, it will not be described.

In a boiling water nuclear power plant according to the present embodiment, an adsorption member 13 having either zeolite, which is a solid acid, or a clay mineral such as montmorillonite is installed the outlet of the steam dryer 4 in the reactor pressure vessel 1 to hold N-16 for the half-life period of N-16 or longer as with the embodiment 1. These minerals have an acid center in their molecular frames and can adsorb and hold ammonia. Furthermore, they can hold ammonia by the substitution reaction of cations included in them. It is possible to synthesize zeolite including various metal ions and a clay mineral including various cations between layers of a layered structure, and selecting the metal ions or the cations can be adjusted the acid strength of the zeolite or the clay mineral, and the time period for holding N-16.

As the minerals used in the present embodiment such as zeolite and clay minerals, those artificially synthesized or obtained by cation substitution, or those naturally produced may be used. One kind of mineral or a mixture of multiple minerals may be used.

In the present embodiment, the adsorption member 13 having either the zeolite or the clay mineral may be installed in any location in which it is come in contact with steam in the reactor pressure vessel 1; for example, any place between the steam separator and the inlet of the main steam pipe may be chosen.

The adsorption member 13 has a structure body made of metal and the like, and either the zeolite or the clay mineral applied and attached to the structure body. The adsorption member 13 may be composed by filling a casing made of gauze with either the zeolite or the clay mineral.

As above, according to the present embodiment, since the adsorption member 13 having either the zeolite or the clay mineral can be installed in the location (for example, the outlet of the steam dryer 4) in which it is come in contact with steam in the reactor pressure vessel 1 to adsorb and hold ammonia containing N-16, the N-16 decays into O-16 and the N-16 supplied to the turbine system can be decreased. Therefore, a radiation dose rate in the turbine system can be reduced. In addition, the zeolite and the clay minerals to be installed can be those naturally produced, which are adaptable in the environment upon the final disposal by burial as radioactive waste.

[Embodiment 4]

Figure 6:
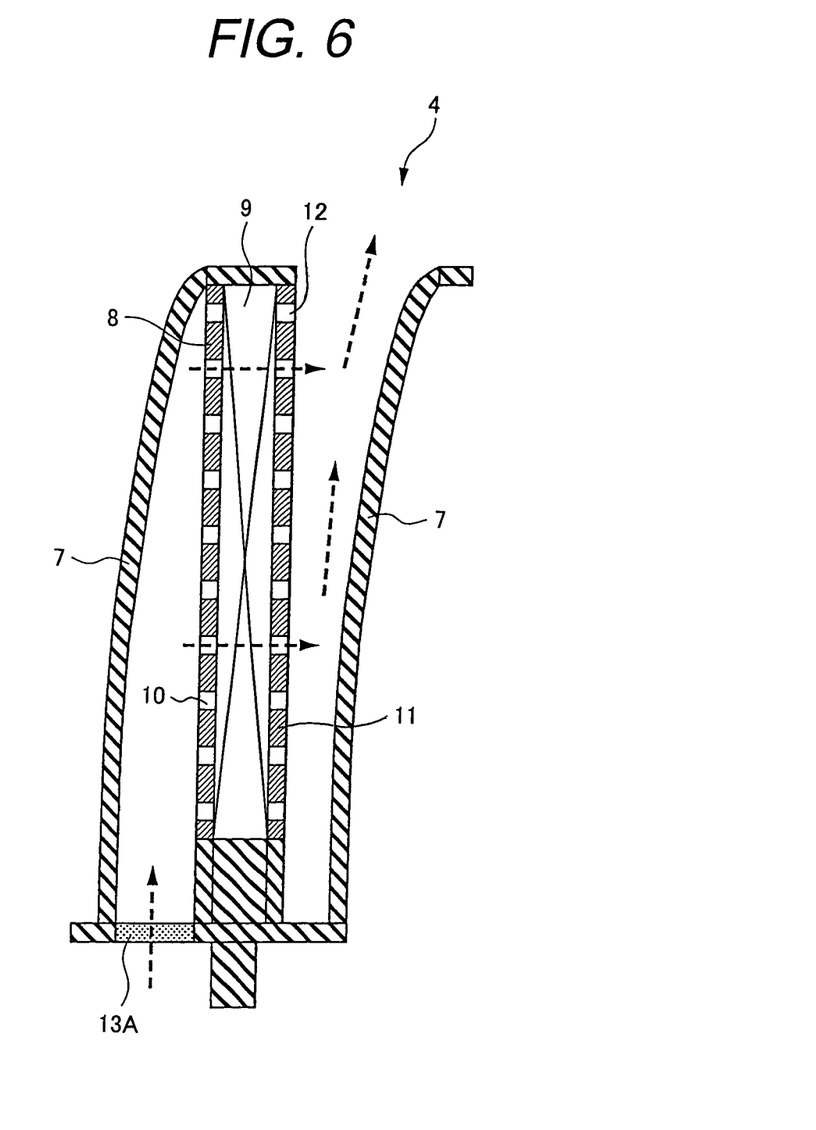
FIG. 6 is a longitudinal sectional view showing a steam dryer used in a boiling water nuclear plant according to embodiment 4 which is another embodiment of the present invention.

A boiling water nuclear plant of embodiment 4 will be described with reference to FIG. 6.

The boiling water nuclear plant of the present embodiment has an adsorption member 13A disposed in each of the inlet formed between the hood plate 7 and the perforated plate 8 in the steam dryer 4. The adsorption member 13A is attached to the hood plate 7, and has a structure body made of metal and the like, and the complex oxide applied and attached to the structure body as with the embodiment 1.

The steam discharged from the steam separator 3 passes through the adsorption member 13A and is introduced a space formed between the hood plate 7 and the perforated plate 8 in the steam dryer 4. The complex oxide of the adsorption member 13A adsorbs a nitrogen compound containing N-16 contained in the steam supplied to the steam dryer 4. The steam from which the nitrogen compound was removed is supplied to the turbine through the main steam pipe.

The present embodiment can obtain each effect generated in the embodiment 1.

The adsorption member 13 used in the embodiment 2 or the adsorption member 13 used in the embodiment 3 may be used in the present embodiment as the adsorption member 13A.

[Embodiment 5]

Figure 7:
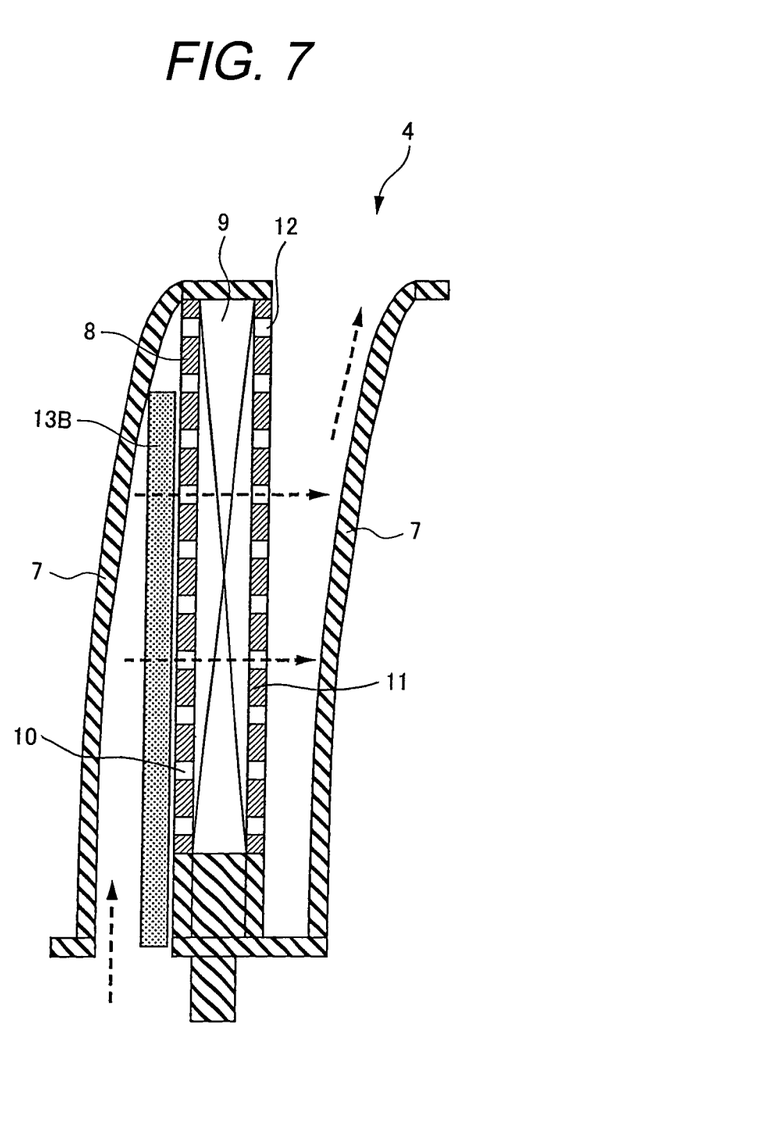
FIG. 7 is a longitudinal sectional view showing a steam dryer used in a boiling water nuclear plant according to embodiment 5 which is another embodiment of the present invention.

A boiling water nuclear plant of embodiment 5 will be described with reference to FIG. 7.

The boiling water nuclear plant of the present embodiment has an adsorption member 13B disposed in front of the steam inlet side of the perforated plate 8 in the steam dryer 4. The adsorption member 13B is attached to the perforated plate 8, and has a structure body made of metal and the like, and the complex oxide applied and attached to the structure body as with the embodiment 1.

The steam discharged from the steam separator 3 is supplied to the steam dryer 4, passes through the adsorption member 13B and is introduced between the corrugated plates 9 through the plurality of through holes 10 formed in the perforated plate 8. The complex oxide of the adsorption member 13B adsorbs a nitrogen compound containing N-16 contained in the steam introduced between the corrugated plates 9 of the steam dryer 4. The steam from which the nitrogen compound was removed is supplied to the turbine through the main steam pipe.

The present embodiment can obtain each effect generated in the embodiment 1.

The adsorption member 13 used in the embodiment 2 or the adsorption member 13 used in the embodiment 3 may be used in the present embodiment as the adsorption member 13B.

[Embodiment 6]

Figure 8:
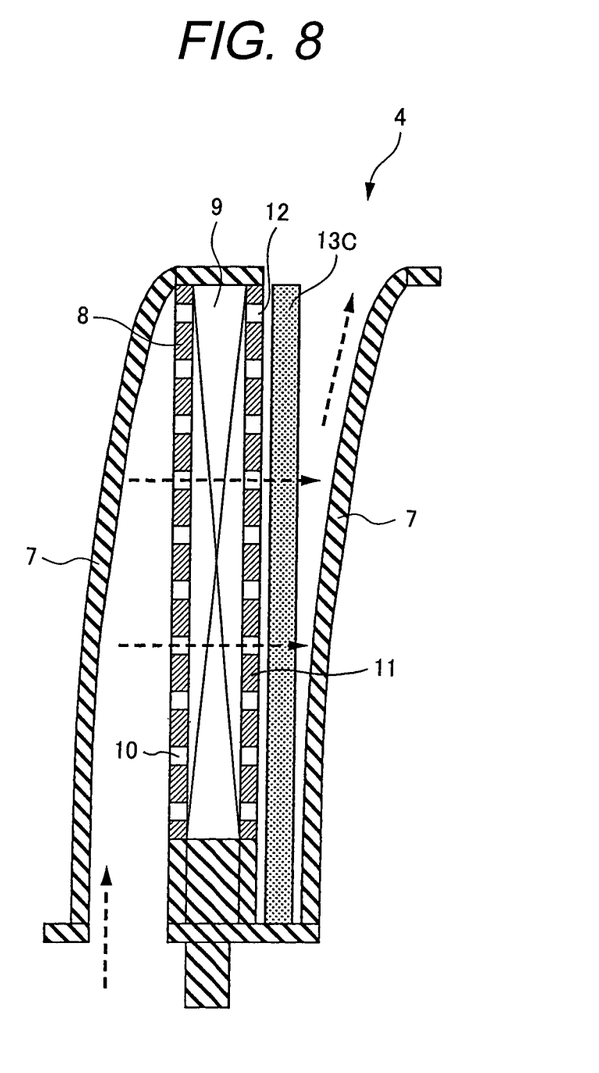
FIG. 8 is a longitudinal sectional view showing a steam dryer used in a boiling water nuclear plant according to embodiment 6 which is another embodiment of the present invention.

A boiling water nuclear plant of embodiment 6 will be described with reference to FIG. 8.

The boiling water nuclear plant of the present embodiment has an adsorption member 13C disposed in back of the steam outlet side of the perforated plate 11 in the steam dryer 4. The adsorption member 13C is attached to the perforated plate 11, and has a structure body made of metal and the like, and the complex oxide applied and attached to the structure body as with the embodiment 1.

The steam discharged from the steam separator 3 is supplied to the steam dryer 4, is introduced between the corrugated plates 9 through the plurality of through holes 10 formed in the perforated plate 8, and is discharged from the plurality of through holes 12 formed in the perforated plate 11. The steam discharged from the through holes 12 passes through the adsorption member 13C and is introduced into the upper region in the reactor pressure vessel 1 through the outlet of the steam dryer 4. The complex oxide of the adsorption member 13C adsorbs a nitrogen compound containing N-16 contained in the steam discharged from the through holes 12. The steam from which the nitrogen compound was removed is supplied to the turbine through the main steam pipe.

The present embodiment can obtain each effect generated in the embodiment 1.

The adsorption member 13 used in the embodiment 2 or the adsorption member 13 used in the embodiment 3 may be used in the present embodiment as the adsorption member 13C.

[Embodiment 7]

Figure 9:
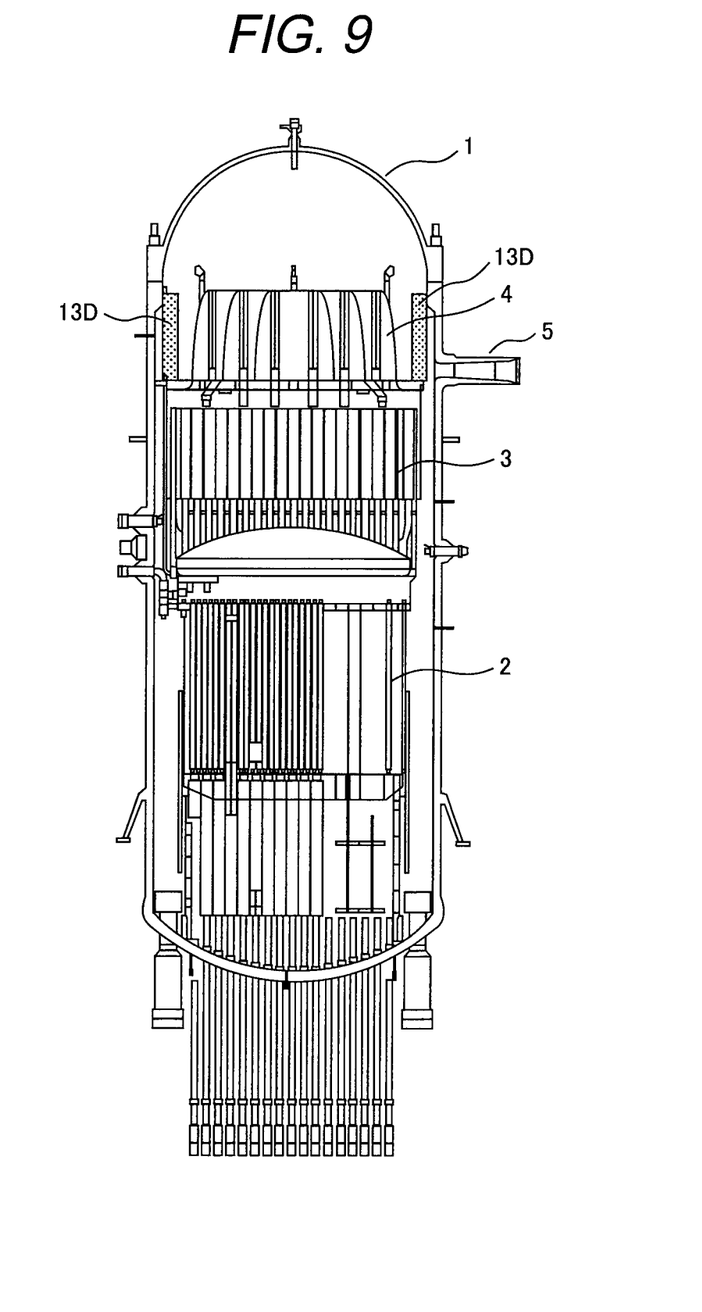
FIG. 9 is a longitudinal sectional view showing a structure of a boiling water nuclear plant according to embodiment 7 which is another embodiment of the present invention.

A boiling water nuclear plant of embodiment 7 will be described with reference to FIG. 9.

The boiling water nuclear plant of the present embodiment has an annular adsorption member 13D surrounding the steam dryer 4 and disposed between the steam dryer 4 and an inlet of the main steam nozzle 5 in the reactor pressure vessel 1. The adsorption member 13D is attached to an inner surface of the reactor pressure vessel 1, and has a structure body made of metal and the like, and the complex oxide applied and attached to the structure body as with the embodiment 1.

The steam discharged from the steam dryer 4 passes through the adsorption member 13D, and is introduced into the main steam nozzle 5 and the main steam pipe. The complex oxide of the adsorption member 13D adsorbs a nitrogen compound containing N-16 contained in the steam discharged from the steam dryer 4. The steam from which the nitrogen compound was removed is supplied to the turbine through the main steam pipe.

The present embodiment can obtain each effect generated in the embodiment 1.

The adsorption member 13 used in the embodiment 2 or the adsorption member 13 used in the embodiment 3 may be used in the present embodiment as the adsorption member 13D.

[Embodiment 8]

Figure 10:
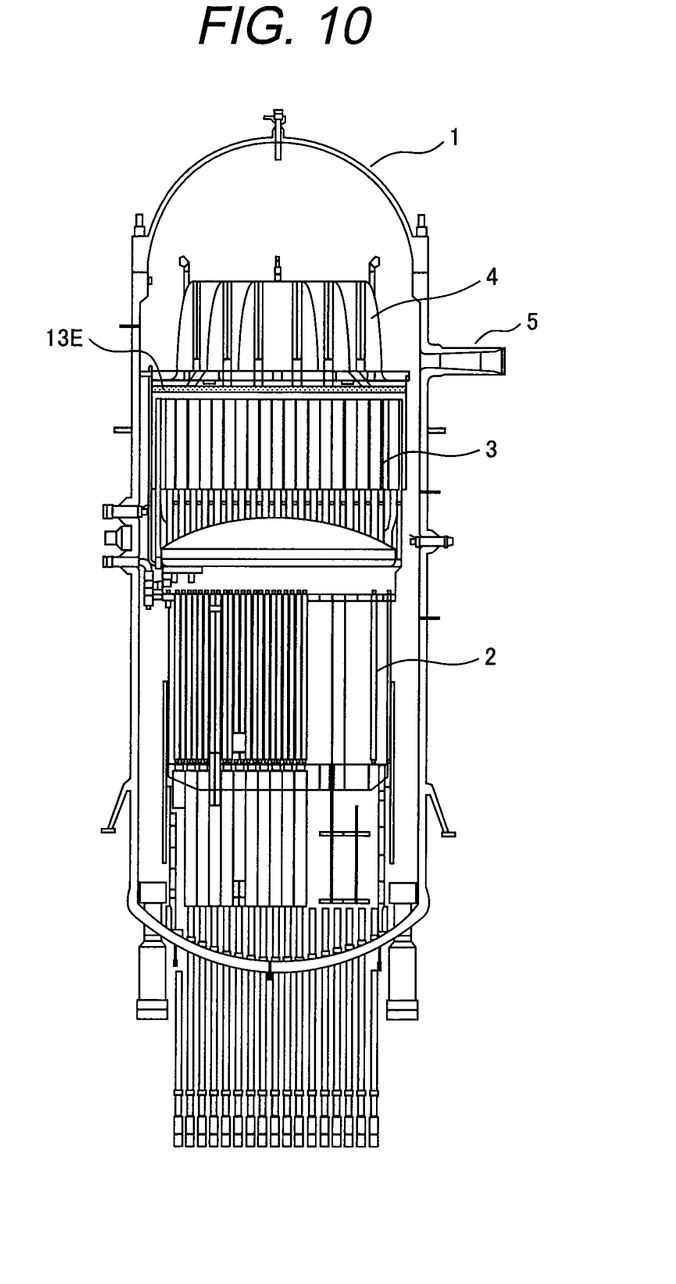
FIG. 10 is a longitudinal sectional view showing a structure of a boiling water nuclear plant according to embodiment 8 which is another embodiment of the present invention.

A boiling water nuclear plant of embodiment 8 will be described with reference to FIG. 10.

The boiling water nuclear plant of the present embodiment has an adsorption member 13E. The adsorption member 13E is disposed between the steam separator 3 and the steam dryer 4. That is, the adsorption member 13E is disposed above the steam separator 3 and below the steam dryer 4. The steam separator 3 is covered with the adsorption member 13E and the adsorption member 13E is attached to a support member of the steam dryer 4.

The steam discharged from the steam separator 3 passes through the adsorption member 13E, and is introduced into the steam dryer 4. The complex oxide of the adsorption member 13E adsorbs a nitrogen compound containing N-16 contained in the steam discharged from the steam separator 3. The steam from which the nitrogen compound was removed is supplied to the turbine through the steam dryer 4 and the main steam pipe.

The present embodiment can obtain each effect generated in the embodiment 1.

The adsorption member 13 used in the embodiment 2 or the adsorption member 13 used in the embodiment 3 may be used in the present embodiment as the adsorption member 13E.

REFERENCE SIGNS LIST

1: reactor pressure vessel, 2: core, 3: steam separator, 4: steam dryer, 5: main steam nozzle, 6: unoccupied orbital, 7: hood plate, 8, 11: perforated plate, 9: corrugated plate, 13, 13A, 13B, 13C, 13D, 13E: adsorption member.

What is claimed is:

1. A boiling water nuclear power plant comprising:
   a reactor pressure vessel; and
   an adsorption member having a material capable of adsorbing and holding N-16, which is a nitrogen compound being gas, installed in a passage, which exists in the reactor pressure vessel, for steam generated in the reactor pressure vessel;
   wherein the material has a molecular entity that is an electron-pair acceptor; and
   wherein the adsorption member is disposed in a region, in which the drying steam exists, between a steam dryer disposed in the reactor pressure vessel and an inlet of a main steam pipe connected to the reactor pressure vessel.

2. The boiling water nuclear power plant according to claim 1,
   wherein the material having the molecular entity that is an electron-pair acceptor is a complex oxide containing at least one of oxides of titanium, zirconium, zinc, aluminum and silicone, and an oxide of one or more kinds of metals other than titanium, zirconium, zinc, aluminum and silicone.

3. The boiling water nuclear power plant according to claim 1,
   wherein the material having the molecular entity that is an electron-pair acceptor is an oxide of at least one of titanium, zirconium, aluminum, zinc, silicone, molybdenum, and tin.

4. The boiling water nuclear power plant according to claim 1,
   wherein the material having the molecular entity that is an electron-pair acceptor is zeolite.

5. The boiling water nuclear power plant according to claim 1,
   wherein the material having the molecular entity that is an electron-pair acceptor is a clay mineral.

6. The boiling water nuclear power plant according to claim 1,
   wherein the adsorption member having the material capable of adsorbing and holding the N-16 is disposed in the passage existing from a steam dryer to an outer portion of the steam dryer in the reactor pressure vessel.

7. The boiling water nuclear power plant according to claim 2,
   wherein the adsorption member having the material capable of adsorbing and holding the N-16 is disposed in the passage existing from a steam dryer to an outer portion of the steam dryer in the reactor pressure vessel.

8. The boiling water nuclear power plant according to claim 3,
   wherein the adsorption member having the material capable of adsorbing and holding the N-16 is disposed in the passage existing from a steam dryer to an outer portion of the steam dryer in the reactor pressure vessel.

9. The boiling water nuclear power plant according to claim 4,
   wherein the adsorption member having the material capable of adsorbing and holding the N-16 is disposed in the passage existing from a steam dryer to an outer portion of the steam dryer in the reactor pressure vessel.

10. The boiling water nuclear power plant according to claim 5,
    wherein the adsorption member having the material capable of adsorbing and holding the N-16 is disposed in the passage existing from a steam dryer to an outer portion of the steam dryer in the reactor pressure vessel.

* * * * *